United States Patent
Hayashi (10) Patent No.: US 9,124,207 B2
(45) Date of Patent: Sep. 1, 2015

(54) ROTARY ELECTRIC MACHINE CONTROL APPARATUS AND ELECTRIC POWER STEERING APPARATUS USING THE SAME

(71) Applicant: DENSO CORPORATION, Kariya, Aichi-pref. (JP)

(72) Inventor: Jirou Hayashi, Ama (JP)

(73) Assignee: DENSO CORPORATION, Kariya (JP)

( * ) Notice: Subject to any disclaimer, the term of this patent is extended or adjusted under 35 U.S.C. 154(b) by 32 days.

(21) Appl. No.: 13/962,192

(22) Filed: Aug. 8, 2013

(65) Prior Publication Data

US 2014/0097776 A1    Apr. 10, 2014

(30) Foreign Application Priority Data

Oct. 9, 2012   (JP) .................. 2012-223991

(51) Int. Cl.
| | | |
|---|---|---|
| H02H 7/08 | (2006.01) | |
| H02P 6/20 | (2006.01) | |
| H02P 25/22 | (2006.01) | |
| H02P 29/02 | (2006.01) | |
| B62D 5/04 | (2006.01) | |

(52) U.S. Cl.
CPC ............... *H02P 6/20* (2013.01); *B62D 5/0403* (2013.01); *B62D 5/0481* (2013.01); *B62D 5/0484* (2013.01); *H02P 25/22* (2013.01); *H02P 29/021* (2013.01); *B62D 5/0487* (2013.01)

(58) Field of Classification Search
CPC ............................. B62D 5/0487; H02P 29/021
USPC ..................................... 318/400.21
See application file for complete search history.

(56) References Cited

U.S. PATENT DOCUMENTS

| | | | |
|---|---|---|---|
| 5,414,339 A * | 5/1995 | Masaki et al. ................ 318/800 |
| 6,775,115 B2 | 8/2004 | Sato | |
| 7,728,531 B2 | 6/2010 | Jeong | |
| 7,839,013 B2 | 11/2010 | Nakamura et al. | |
| 7,847,495 B2 | 12/2010 | Oyobe et al. | |
| 7,891,451 B2 | 2/2011 | Oyobe et al. | |
| 7,948,205 B2 | 5/2011 | Gunji | |

(Continued)

FOREIGN PATENT DOCUMENTS

| | | |
|---|---|---|
| JP | 01-170389 | 7/1989 |
| JP | 07-046766 | 2/1995 |

(Continued)

OTHER PUBLICATIONS

Office Action (7 pages) dated Jan. 22, 2015 issued in corresponding Chinese Application No. 201210555276.7 and English translation (10 pages).

(Continued)

*Primary Examiner* — Erick Glass
(74) *Attorney, Agent, or Firm* — Nixon & Vanderhye PC (57) ABSTRACT

A control unit controls driving of a motor by controlling a first inverter unit and a second inverter unit, specifically by controlling on/off operations of FETs. The control unit functions as an abnormality detection device. The control unit detects a short-circuit abnormality between a first winding set and a second winding set or between the first inverter unit and the second inverter unit, before starting to control driving of the motor, based on phase current values detected by current detectors when a high-side FET of the first inverter unit and a low-side FET of the second inverter unit are turned on.

7 Claims, 7 Drawing Sheets

(56) References Cited

U.S. PATENT DOCUMENTS

| | | | |
|---|---|---|---|
| 7,952,309 | B2 | 5/2011 | Nishimura et al. |
| 8,045,301 | B2 | 10/2011 | Shiba et al. |
| 8,248,010 | B2 | 8/2012 | Mukai et al. |
| 8,335,603 | B2 | 12/2012 | Mitsutani et al. |
| 8,436,568 | B2 | 5/2013 | Mukai et al. |
| 8,528,689 | B2 | 9/2013 | Uryu |
| 8,544,593 | B2 | 10/2013 | Uryu |
| 8,810,179 | B2 | 8/2014 | De Wergifosse |
| 2002/0018823 | A1 | 2/2002 | Ito |
| 2004/0264075 | A1* | 12/2004 | Kolomeitsev .............. 361/23 |
| 2011/0025244 | A1* | 2/2011 | Ura .................... 318/400.21 |
| 2011/0290580 | A1 | 12/2011 | Mukai et al. |
| 2013/0200827 | A1* | 8/2013 | Kezobo et al. ......... 318/400.21 |
| 2013/0207586 | A1 | 8/2013 | Hayashi |
| 2014/0246999 | A1 | 9/2014 | Kezobo et al. |

FOREIGN PATENT DOCUMENTS

| | | |
|---|---|---|
| JP | 2005-304119 | 10/2005 |
| JP | 2007-228777 | 9/2007 |

OTHER PUBLICATIONS

Office Action (1 page) dated Jan. 28, 2014 issued in corresponding Japanese Application No. 2012-026118 and English translation (2 pages).

Office Action (11 pages) dated Oct. 22, 2014 issued in co-pending U.S. Appl. No. 13/734,293.

Notice of Allowance (9 pages) dated Mar. 5, 2015 issued in co-pending U.S. Appl. No. 13/734,293.

\* cited by examiner

ROTARY ELECTRIC MACHINE CONTROL APPARATUS AND ELECTRIC POWER STEERING APPARATUS USING THE SAME

CROSS REFERENCE TO RELATED APPLICATION

This application is based on and incorporates herein by reference Japanese patent application No. 2012-223991 filed on Oct. 9, 2012.

FIELD

The present disclosure relates to a rotary electric machine control apparatus for controlling driving of a rotary electric machine and an electric power steering apparatus using the same.

TECHNICAL BACKGROUND

It is known conventionally that a rotary electric machine control apparatus detects an abnormality of a rotary electric machine such as an electric motor or the control apparatus itself before starting to control driving of the rotary electric machine.

For example, U.S. Pat. No. 8,248,010 B2 (JP-A-2011-135692) discloses a rotary electric machine control apparatus, which is capable of detecting a short-circuit failure, that is, a short-circuit abnormality, of a switching element in an inverter unit and a short-circuit failure of a pre-driver at the time of initial check operation, which is performed before driving of the rotary electric machine is started. The control object of this rotary electric machine control apparatus is a rotary electric machine having two winding sets. For this reason, two inverter circuits are provided in correspondence to the two winding sets.

A short-circuit abnormality is caused sometimes by a conductive foreign particle, which is affixed between two winding sets or two inverter units. However, it is not possible to accurately detect the short-circuit abnormality by the above-referred rotary electric machine control apparatus. As a result, it is likely to be necessitated sometimes to disable both of the two inverter units even when each of the two inverter units is not abnormal. Since the rotary electric machine control apparatus controls the rotary electric machine as a control target, a driver's steering operation cannot be assisted if the rotary electric machine cannot be driven.

SUMMARY

It is therefore an object to provide a rotary electric machine control apparatus, which is capable of accurately detecting a short-circuit abnormality between two winding set or two inverter unit set, and an electric power steering apparatus using such a rotary electric machine control apparatus.

According to one aspect, a rotary electric machine control apparatus is provided for controlling a rotary electric machine, which has two winding sets formed of coils corresponding to plural phases. The rotary electric machine control apparatus comprises two inverter units, a current detection device and a control unit. The two inverter units are provided in correspondence to the two winding sets for converting electric power from a power source to the rotary electric machine by turning on and off plural switching elements, which include high-potential side switching elements provided at a high-potential side of the power source and low-potential side switching elements provided at a low-potential side. The high-potential side switching element and the low-potential side switching element form a switching element pair corresponding to a phase of the winding in each of the winding set. The current detection device detects a phase current flowing in each of the two inverter units. The control unit controls driving of the rotary electric machine by controlling on/off operations of the switching elements of the two inverter units.

The control unit includes an abnormality detection device for detecting, before starting of drive control for the rotary electric machine, a short-circuit abnormality between the two winding sets or the two inverter units based on a current detection value of the current detection device by turning on only at least one of the high-potential side switching elements of one of the two inverter units and at least one of the low-potential side switching elements of the other of the two inverter units. Preferably, the control unit controls driving of the rotary electric machine by only one of the two inverter units when the abnormality detection device detects the short-circuit abnormality.

EMBODIMENT

A rotary electric machine control apparatus will be described below with reference to the accompanying drawings, in which the same configurations are designated by the same reference numerals among plural embodiments thereby to simplify the description.

First Embodiment

Figure 1:
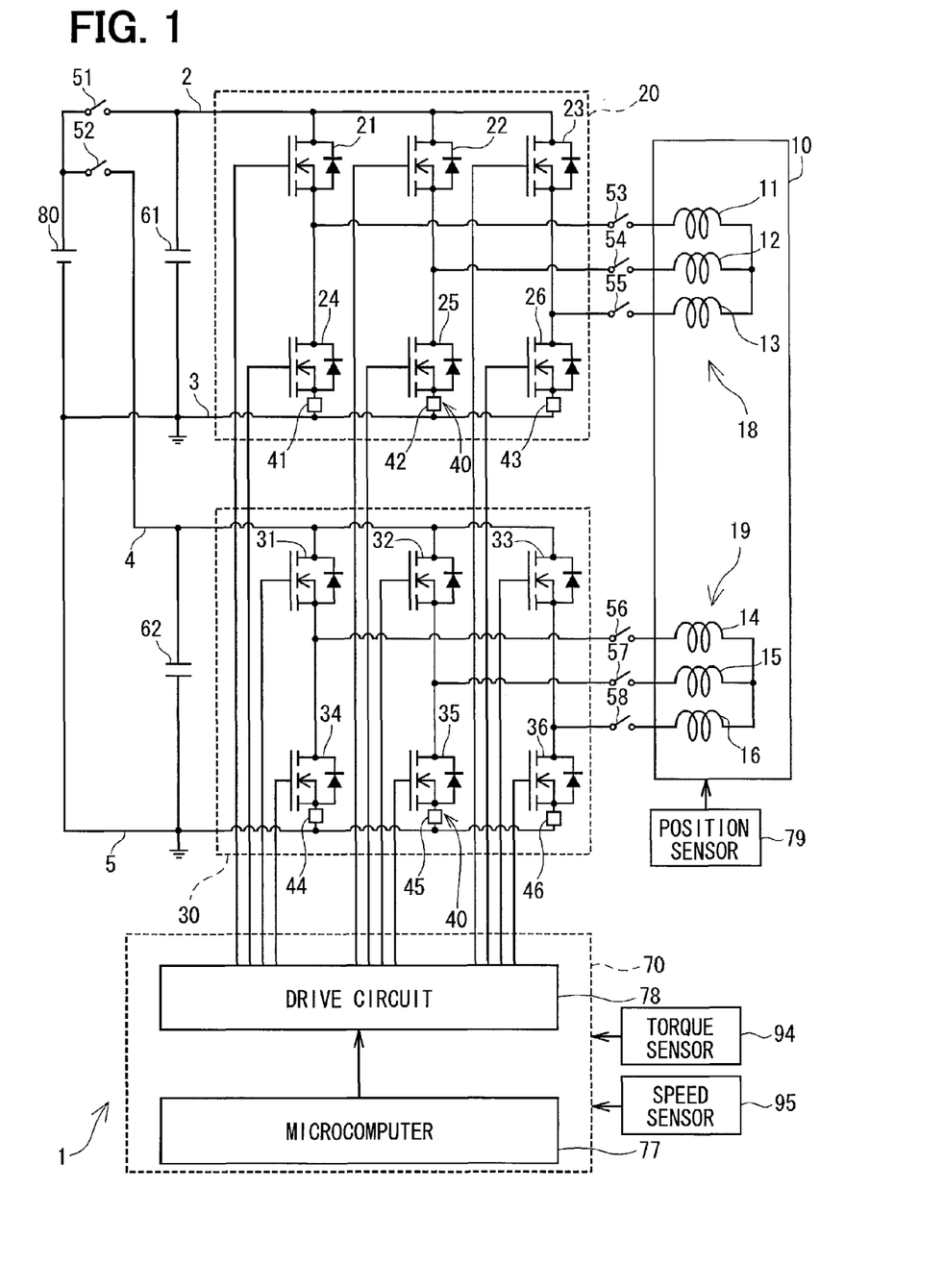
FIG. 1 is a circuit diagram showing, partly in a block form, a rotary electric machine control apparatus according to a first embodiment.

Referring to FIG. 1, a rotary electric machine control apparatus (simply referred to as a control apparatus) 1 according a first embodiment is for controlling driving of a motor 10 provided as a rotary electric machine. The control apparatus 1 is used together with the motor 10 in, for example, an electric power steering apparatus 99 for assisting a steering operation in a vehicle.

Figure 2:
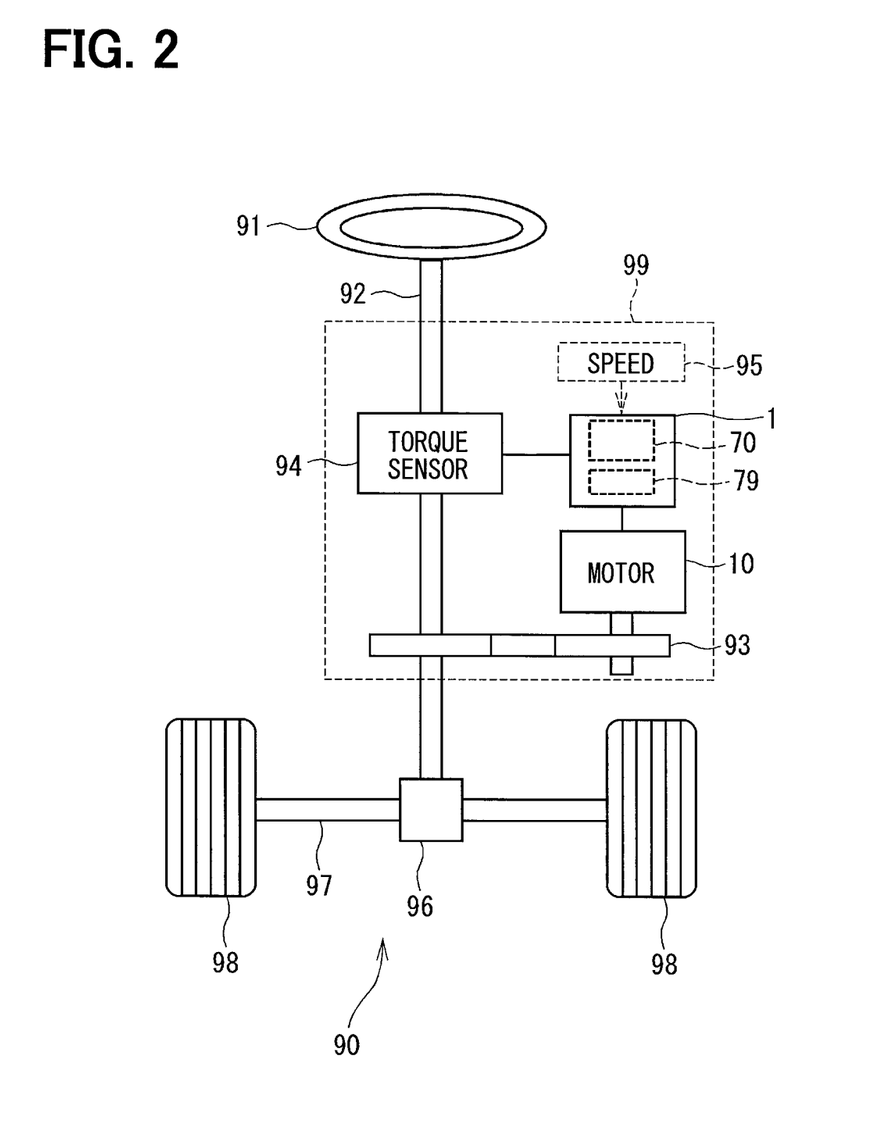
FIG. 2 is a schematic illustration of an electric power steering apparatus, which uses the rotary electric machine control apparatus according to the first embodiment.

As shown in FIG. 2, the electric power steering apparatus 99 is provided for an electric power steering system 90. In the rotary electric machine control apparatus 99, a torque sensor 94 is provided on a steering shaft 92 coupled to a steering wheel 91. The torque sensor 94 detects a steering torque, which is applied to the steering shaft 92 by a driver through the steering wheel 91.

At the bottom end of the steering shaft 92, a pinion gear 96 is provided. The pinion gear 96 is meshed with a rack shaft 97. A pair of tire wheels 98 is coupled rotatably to both ends of the rack shaft 97 through tie rods and the like. Thus, when the steering wheel 91 is rotated by a driver, the steering shaft 92 coupled to the steering wheel 91 is rotated. The rotary motion of the steering shaft 92 is converted into a linear motion of the rack shaft 97 by the pinion gear 96 so that the pair of wheels 98 is steered by an angle corresponding to the linear movement of the rack shaft 97.

The electric power steering apparatus 99 is formed of the motor 10 for generating steering assist torque, the control apparatus 1 for controlling driving of the motor 10, a reduction gear 93 for transferring rotation of the motor 10 to the steering shaft 92 with reduced speed. The motor 10 rotates the reduction gear 93 in both normal and reverse directions. The electric power steering apparatus 99 includes, in addition to the torque sensor 94, a vehicle speed sensor 95 for detecting a vehicle speed. With the configuration described above, the electric power steering apparatus 99 generates the steering assist torque for assisting the steering operation of the steering wheel 91 from the motor 10 and transfers the generated torque to the steering shaft 92.

The motor 10 is a three-phase brushless motor, which is powered by a battery 80, which is an electric power source. The motor 10 is formed of a rotor and a stator, which are not shown. The rotor is a disk-shaped body. Permanent magnets are fixed to an outside surface or an inside surface of the rotor to provide magnetic poles. The stator accommodates the rotor therein and rotatably supports the rotor. The stator has salient poles, which protrude in a radially inward direction and are provided at a predetermined angular interval in a circumferential direction. On the salient poles, coils 11 to 16 are wound as windings shown in FIG. 1. The coils 11 to 13 are connected at a neutral point and form a first winding set 18. The coils 14 to 16 are also connected at a neutral point and form a second winding set 19. The first winding set 18 and the second winding set 19 correspond to two winding sets. The motor 10 is provided with a position sensor 79, which detects a rotational position of the rotor of the motor 10.

The control apparatus 1 is provided with a first inverter unit 20, a second inverter unit 30, a current detection device 40, a control unit 70 and the like. The first inverter unit 20 is a three-phase inverter, in which six switching elements 21 to 26 are connected in a bridge form to switch over current supply to the coils 11 to 13 of the first winding set 18. Each switching element 21 to 26 is a MOSFET (metal-oxide-semiconductor field-effect transistor). The switching elements 21 to 26 are referred to as FETs 21 to 26 below, respectively.

Three FETs 21 to 23 have drains connected to a high-side bus 2 connected to the positive polarity side of the battery 80. Sources of the FETs 21 to 23 are connected to drains of the FETs 24 to 26, respectively. Sources of the FETs 24 to 26 are connected to a low-side bus 3 connected to the negative polarity side of the battery 80, that is, ground. A junction between the FET 21 and the FET 24, which form a switching element pair, is connected to one end of the coil 11. A junction between the FET 22 and the FET 25, which form a switching element pair, is connected to one end of the coil 12. A junction between the FET 23 and the FET 26, which form a switching element pair, is connected to one end of the coil 13.

The second inverter unit 30 is also a three-phase inverter similarly to the first inverter unit 20. In the second inverter unit 30, six switching elements 31 to 36 are connected in a bridge form to switch over current supply to the coils 14 to 16 of the second winding set 19. The switching elements 31 to 36 are also MOSFETs similarly to the switching elements 21 to 26. The switching elements 31 to 36 are referred to as FETs 31 to 36 below, respectively. Three FETs 31 to 33 have drains connected to a high-side bus 4 connected to the positive polarity side of the battery 80. Sources of the FETs 31 to 33 are connected to drains of the FETs 34 to 36, respectively. Sources of the FETs 34 to 36 are connected to a low-side bus 5 connected to the negative polarity side of the battery 80, that is, ground.

A junction between the FET 31 and the FET 34, which form a switching element pair, is connected to one end of the coil 14. A junction between the FET 32 and the FET 35, which form a switching element pair, is connected to one end of the coil 15. A junction between the FET 33 and the FET 36, which form a switching element pair, is connected to one end of the coil 16.

The FETs 21 to 23 are provided as high-potential side switching elements in the first inverter unit 20. The FETs 31 to 33 are provided as high-potential side switching elements in the second inverter unit 30. The FETs 24 to 26 provided as low-potential side switching elements in the first inverter unit 20. The FETs 34 to 36 are provided to as low-potential side switching elements in the second inverter unit 30. The high-potential side switching element and the low-potential switching element are provided as a high FET (referred to as H-FET) and a low FET (referred to as L-FET), respectively. When necessary, a corresponding phase is identified like a U-low FET (U-L-FET) 24. The control apparatus 1 includes two systems of inverters, which are the first inverter unit 20 and the second inverter unit 30. The system of the first inverter unit 20 and the system of the second inverter unit 30 are referred to as a first system and a second system, respectively, below.

The current detection unit 40 is formed of current detectors 41 to 46, which are provided for each switching element pair. The current detector 41 is provided between the U-L-FET 24 and the ground to detect a current, which flows in the coil 11. The current detector 42 is provided between the V-L-FET 25 and the ground to detect a current, which flows in the coil 12. The current detector 43 is provided between the W-L-FET 26 and the ground to detect a current, which flows in the coil 13. The current detector 44 is provided between the U-L-FET 34 and the ground to detect a current, which flows in the coil 14. The current detector 45 is provided between the V-L-FET 35 and the ground to detect a current, which flows in the coil 15. The current detector 46 is provided between the W-L-FET 36 and the ground to detect a current, which flows in the coil 16.

The current detectors 41 to 46 may be shunt resistors, respectively. Detection values (current detection values) of the current detectors 41 to 46 are stored in registers in the control unit 70. Control signal lines from the detection device 40 and the position sensor 79 to the control unit 70 are not shown in FIG. 1 for brevity.

As shown in FIG. 1, the control apparatus 1 is further provided with capacitors 61, 62. The capacitor 61 is provided to connect the high side bus 2 and the low side bus 3. The capacitor 62 is provided to connect the high side bus 4 and the low side bus 5. The capacitors 61, 62 store charges of the battery 80 to supplement power supply to the FETs 21 to 26, 31 to 36 and suppress noise components such as surge currents.

The control apparatus 1 is further provided with relays 51 to 58. The relay 51 is provided in the high-side bus 2 between the battery 80 and the first inverter unit 20. The relay 51 allows current flow between the battery 80 and the first inverter unit 20 when turned on. The relay 51 shuts off current flow between the battery 80 and the first inverter unit 20 when turned off. The relay 52 is provided in the high-side bus 4 between the battery 80 and the second inverter unit 30. The relay 52 allows current flow between the battery 80 and the second inverter unit 30 when turned on. The relay 52 shuts off current flow between the battery 80 and the second inverter unit 30 when turned off.

The relays 53 to 55 are provided between the first inverter unit 20 and the coils 11 to 13, respectively. The relays 53 to 55 allow current flow between the first inverter unit 20 and the coils 11 to 13 when turned on, respectively. The relays 53 to 55 shut off current flow between the first inverter unit 20 and the coils 11 to 13 when turned off, respectively. The relays 56 to 58 are provided between the second inverter unit 30 and the coils 14 to 16, respectively. The relays 56 to 58 allow current flow between the second inverter unit 30 and the coils 14 to 16 when turned on, respectively. The relays 56 to 58 shut off current flow between the second inverter unit 30 and the coils 14 to 16 when turned off, respectively. The relays 51 to 58 are controlled to turn on and off (on/off state) by the control unit 70 as described below.

The control unit 70 is configured to control entire operation of the control apparatus 1 and formed of a microcomputer 77, registers not shown, a drive circuit 78 and the like. The position sensor 79, the torque sensor 94 and the vehicle speed sensor 95 are connected to the control unit 70. Thus the control unit 70 acquires a motor rotation position θ, which is a rotational position of the motor 10, detected by the position sensor 79, a steering torque Tq* detected by the torque sensor 94 and a vehicle speed Vdc detected by the vehicle speed sensor 95. Control processing for driving the motor 10, which is executed by the control unit 70 during a normal operation, that is, the control apparatus 1 is operating normally, will be described below briefly.

The control unit 70 controls operations of the relays 51 to 58 and the inverter unit (first inverter unit 20 or second inverter unit 30) based on states of first and second drive flags provided for the first system and the second system, respectively. For example, when the first drive flag for the first system is ON, the control unit 70 controls the relays 51 and 53 to 55 to turn on so that the first inverter unit 20 drives the motor 10. When the first drive flag for the first system is OFF, the control unit 70 controls the relays 51 and 53 to 55 to turn off so that the first inverter unit 20 stops driving the motor 10. Similarly, when the second drive flag for the second system is ON, the control unit 70 controls the relays 52 and 56 to 58 to turn on so that the second inverter unit 30 drives the motor 10. When the second drive flag for the second system is OFF, the control unit 70 controls the relays 52 and 56 to 58 to turn off so that the second inverter unit 30 stops driving the motor 10. Normally (in normal operation), the drive flags for the first system and the second system are set to ON.

The processing for controlling the first inverter unit 20 performed by the control unit 70, specifically by the microcomputer 77, will be described below. The similar processing is executed for the second inverter unit 30. The control unit 70 retrieves the current detection values detected by the current detectors 41 to 43 and stored in the registers. The control unit 70 calculates a current value IU1 of the coil 11, a current value IV1 of the coil 12 and a current value IW1 of the coil 13 from the current detection values and calculates a d-axis current detection value Id and a q-axis current detection value. Iq based on the calculated three-phase currents IU1, IV1, IW1 and the motor rotation position θ acquired from the position sensor 79.

The control unit 70 further calculates a d-axis command current Id* and a q-axis command current Iq* based on the motor rotation position θ acquired from the position sensor 79, the steering torque Tq* acquired from the torque sensor 94 and the vehicle speed Vdc acquired from the vehicle speed sensor 95. The control unit 70 calculates, by current feedback control processing, a d-axis command voltage Vd and a q-axis command voltage Vq from the calculated d-axis command current Id* and the calculated q-axis command current Iq*. The control unit 70 calculates a U-phase command voltage Vu*, a V-phase command voltage Vv* and a W-phase command voltage Vw*, which are three-phase command voltage values, based on the calculated command voltages Vd, Vq and the motor rotation position θ.

The control unit 70 calculates a U-phase duty Du, a V-phase duty Dv and a W-phase duty Dw, which are duty command signals, based on the three-phase voltages VU*, Vv*, Vw* and a capacitor voltage Vc and stores the U-phase duty Du, the V-phase duty Dv and the W-phase duty Dw in the registers. The drive circuit 78 compares the duty command signals with a PWM reference signal to control switching timing of turning on and off the FETs 21 to 26.

By controlling on/off of the FETs 21 to 26 by the drive circuit 78, voltages are applied to phase coils (coils 11 to 13) of three-phases (U-phase, V-phase W-phase), respectively. Since a voltage vector changes continuously, a sine wave voltage is applied to each phase coil. When the voltages are applied to phase coils, currents flow in the phase coils (coils 11 to 13) in correspondence to applied voltages, respectively. Thus the motor 10 generates a torque (Tq1) by an operation of the first inverter unit 20 (first system). Since the second inverter unit 30 (second system) is controlled similarly to the first inverter unit 20, the motor 10 generates a torque (Tq), which is a sum of the torque (Tq1) corresponding to the operation of the first inverter unit 20 and a torque (Tq2) corresponding to the operation of the second inverter unit 30. The torque (Tq) is supplied to the steering shaft 92 via the reduction gear 93 as the assist torque for assisting the steering operation of a driver.

The abnormality detection by the control apparatus 1 according to the first embodiment will be described next. The control unit 70 can detect a short-circuit abnormality between the first system and the second system, that is, between the first winding set 18 and the second winding set 19 or between the first inverter unit 20 and the second inverter unit 30, by a series of processing S100 shown in FIG. 3.

Figure 3:
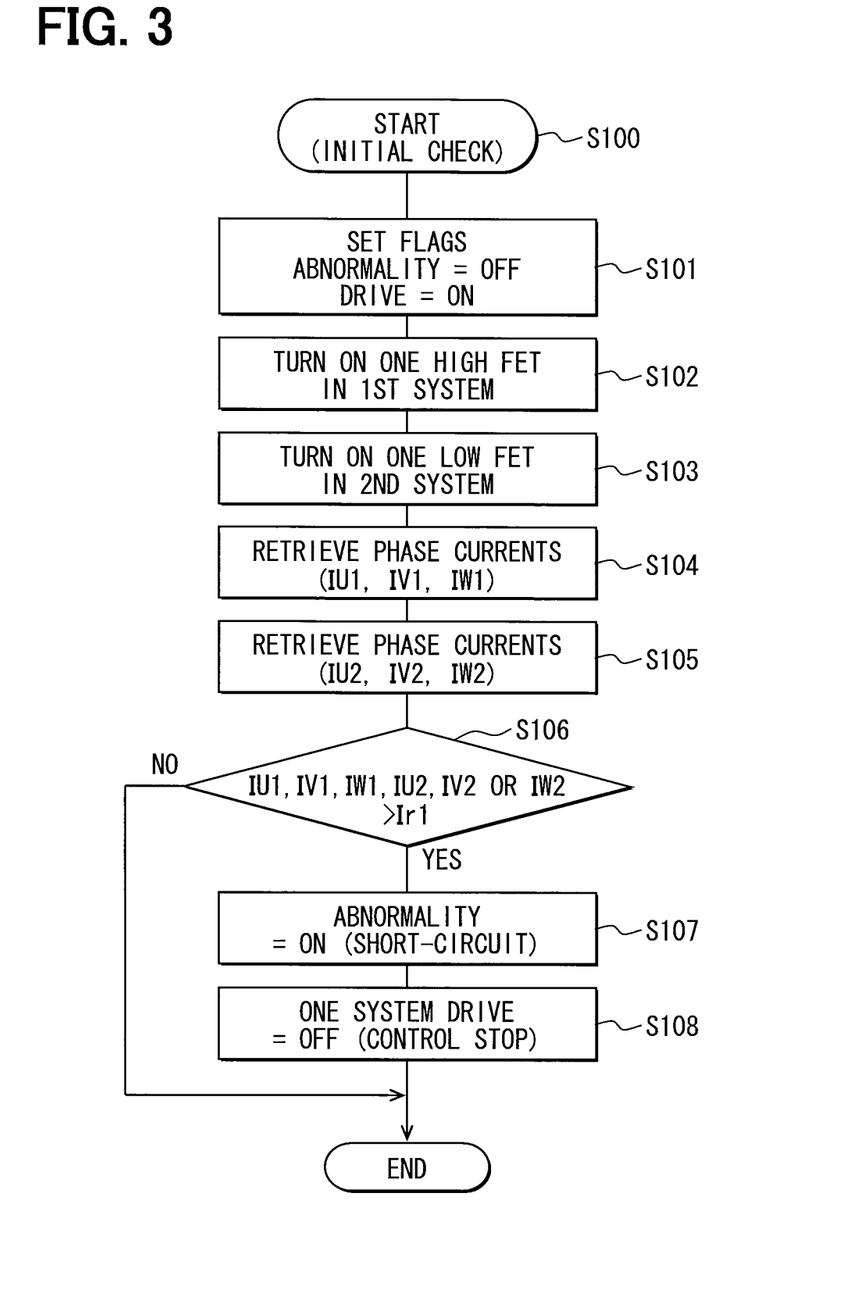
FIG. 3 is a flowchart showing abnormality detection processing performed by the rotary electric machine control apparatus according to the first embodiment.

The control unit 70 executes the processing S100 when an ignition key of a vehicle is turned on, that is, the control apparatus 1 is powered by the battery 80. The control unit 70 executes S100 before processing normal drive control for the motor 10, which is performed for driving the motor 10. That is, S100 is one of initial check processing, which is executed before starting the drive control for the motor 10. The control unit 70 controls the relays 51 to 58 to turn on at the time of execution of the processing S100.

At S101, the control unit 70 executes an initial setting of an abnormality detection flag and drive flags. The abnormality flag is provided as a flag, which indicates that the control unit 70 has detected a short-circuit abnormality. Specifically, the control unit 70 sets the abnormality flag to OFF, which indicates no abnormality, and sets both first and second drive flags for the first system and the second system to ON. After S101, the control unit 70 executes S102. At S102, the control unit 70 controls one FET of the three H-FETs (21 to 23) of the first system, that is, the first inverter unit 20 to turn on. Here it is assumed that the H-FET 21 is turned on.

At S103, the control unit 70 controls one FET of the three low FETs (34 to 36) of the second system, that is, the second inverter unit 30, to turn on. It is assumed that the L-FET 34 is turned on. At S104, the control unit 70 retrieves the phase currents of the first system. That is, the control unit 70 retrieves the U-phase current IU1, the V-phase current IV1, the W-phase current IW1 detected by the current detectors 41, 42 43, respectively. It is noted that, with only the H-FET 21 of the first system and the L-FET 34 of the second system, no current flows from the battery 80 to the winding sets 18 and 18 as long as no short-circuit arises between the first system and the second system.

At S105, the control unit 70 retrieves the phase currents of the second system. That is, the control unit 70 retrieves the U-phase current IU2, the V-phase current IV2, the W-phase current IW2 detected by the current detectors 44, 45, 46, respectively. At S106, the control unit 70 checks whether either one of the currents IU1, IV1, IW1, IU2, IV2, IW2 is greater than a predetermined reference value Ir1. The control unit 70 checks whether the current IU2 is greater than the predetermined reference value. When the current IU2 is greater than the predetermined reference value (S106: YES), the control unit 70 executes S107. When the current IU2 is equal to or less than the predetermined reference value (S106: NO), the control unit 70 finishes the series of processing S100. At S107, the control unit 70 determines that the short-circuit abnormality is present between the first winding set 18 and the second winding set 19 or between the first inverter unit 20 and the second inverter unit 30 and sets the abnormality detection flag to ON. At S108, the control unit 70 sets the drive flag of either one of the first system and the second system. The control unit 70 sets the drive flag for the second system to OFF. After S108, the control unit 70 finishes the series of processing S100. The control unit 70 thus operates as an abnormality detection device in the series of processing S100.

The control unit 70 starts the normal drive control for the motor 10 after the series of processing S100. For example, when the control unit 70 detects no short-circuit abnormality (S106: NO), it starts to control driving of the motor 10 by the first inverter unit 20 and the second inverter unit 30 because the abnormality detection flag is OFF and both drive flags for the first system and the second system are ON. When the control unit 70 detects the short-circuit abnormality (S106: YES), it starts to control driving of the motor 10 by only the first inverter unit 20 because the abnormality detection flag is ON and the drive flags of the first system and the second system are ON and OFF, respectively.

One exemplary operation of the control apparatus 1 according to the first embodiment will be described with reference to FIGS. 4A and 4B.

(Normal Operation Case)

Figure 4A:
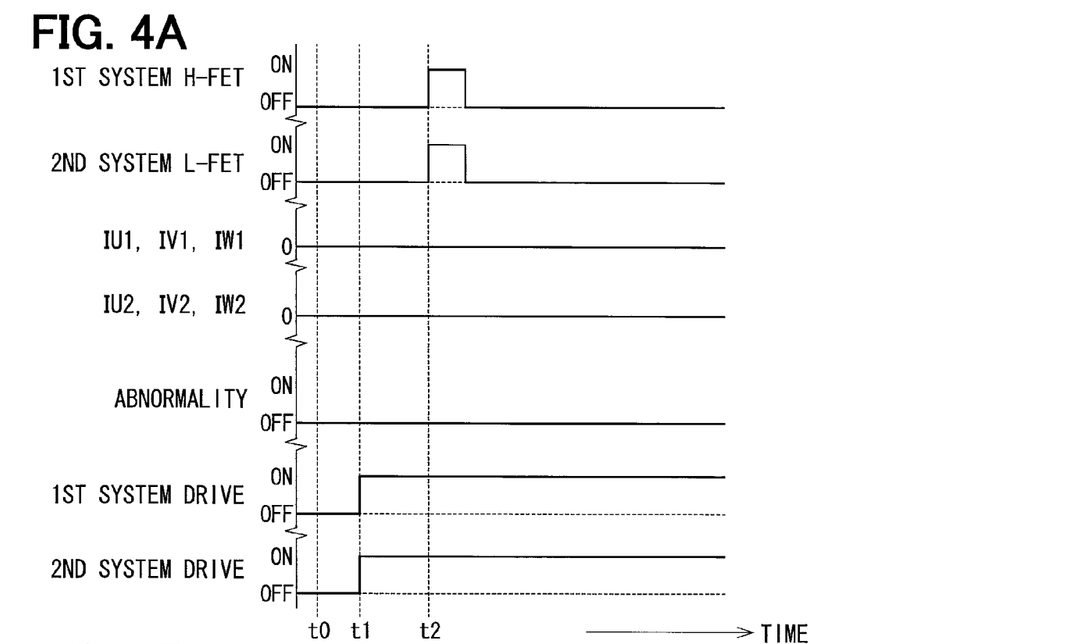
FIGS. 4A and 4B are time charts showing operations of the rotary electric machine control apparatus according to the first embodiment in a normal operation case and an abnormal operation case, respectively.

When the control apparatus 1 operates normally, that is, no short-circuit abnormality is present between the first winding set 18 and the second winding set 19 nor between the first inverter unit 20 and the second inverter unit 30, it operates as shown in FIG. 4A.

When the ignition key is turned on at time t0, the H-FET 21 and the L-FET 34 are OFF and the current detection values IU1 and IU2 are 0, the abnormality detection flag is OFF and both drive flags of the first system and the second system are OFF. When the control unit 70 executes S101 at time t1, the abnormality detection flag remains OFF but the drive flags of the first system and the second system are set to ON. When the control unit 70 executes S102 and S103 at time t2, the H-FET 21 and the L-FET 34 are turned on.

Because the currents IU1 and IU2 are 0 after time t2, the control unit 70 does not detect any short-circuit abnormality. The abnormality flag remains OFF and the drive flags of the first system and the second system remain ON. The control unit 70 therefore starts to control driving of the motor 10 by the first inverter unit 20 and the second inverter unit 30 after the series of processing S100 (initial check processing).

(Abnormal Operation Case)

Figure 4B:
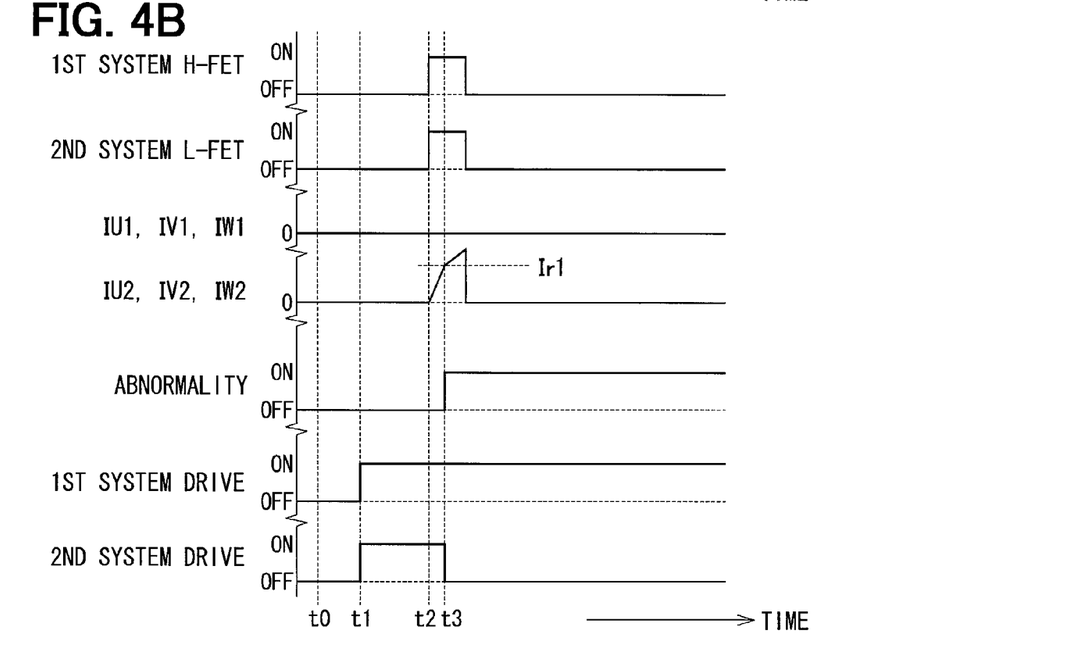

When the control apparatus 1 has an abnormality, that is, for example, a short-circuit abnormality arises between the first system and the second system first winding set 18 and the second winding set 19, it operates as shown in FIG. 4B. When the ignition key is turned on at time t0, the H-FET 21 and the L-FET 34 are OFF and the current detection values IU1 and IU2 are 0, the abnormality detection flag is OFF and both drive flags of the first system and the second system are OFF. When the control unit 70 executes S101 at time t1, the abnormality detection flag remains OFF but the drive flags of the first system and the second system are set to ON. When the control unit 70 executes S102 and S103 at time t2, the H-FET 21 and the L-FET 34 are turned on.

Because the short-circuit abnormality is present between the first winding set 18 and the second winding set 19, the current flows though the H-FET 21 and the L-FET 34 and the current detection value IU2 increases after time t2. When IU2 reaches the predetermined reference value at time t3 S106: YES), the control unit 70 detects the short-circuit abnormality and sets the abnormality detection flag to ON (S107). The drive flag for the second system is changed from ON to OFF (S108). The control unit 70 therefore starts to control driving of the motor 10 by only the first inverter unit 20 after the series of processing S100 (initial check processing), that is, after time t3. When the ignition key is turned off, the abnormality detection flag and the drive flags of the first system and the second system are set to OFF.

As described above, the control unit 70 operating as the abnormality detection device detects the short-circuit abnormality between the two winding sets 18, 19 or between the two inverter units 20, 30 before starting to control driving of the motor 10 based on the phase current values detected by the current detectors 41 to 46 when the high-potential side switching element 21 to 23 of one of the two inverter units 20, 30 and the low-potential side switching element 34, 35, 36 of the other inverter unit 30. The control unit 70 has the abnormality detection device (functions as the abnormality detection device). As a result, before the drive control for the motor 10 is started, that is, at the time of initial check operation, the short-circuit abnormality between the two winding sets 18, 19 and the inverter units 20, 30 can be detected accurately.

Even when the short-circuit abnormality arises between the two winding sets 18, 19 or between the two inverter units 20, 30, each inverter unit 20, 30 itself is not in failure but is normal in may cases. Accordingly, even when the control unit 70 detects the short-circuit abnormality, the motor 10 is driven by only one of the two inverter units 20, 30. That is, since the other inverter is prohibited from operating to drive the motor 10, driving of the motor 10 can be started although the motor 10 generates only reduced output. As a result, even when the short-circuit abnormality described above arises, a steering operation of a driver can be assisted by the electric power steering apparatus 99.

Second Embodiment

Figure 5:
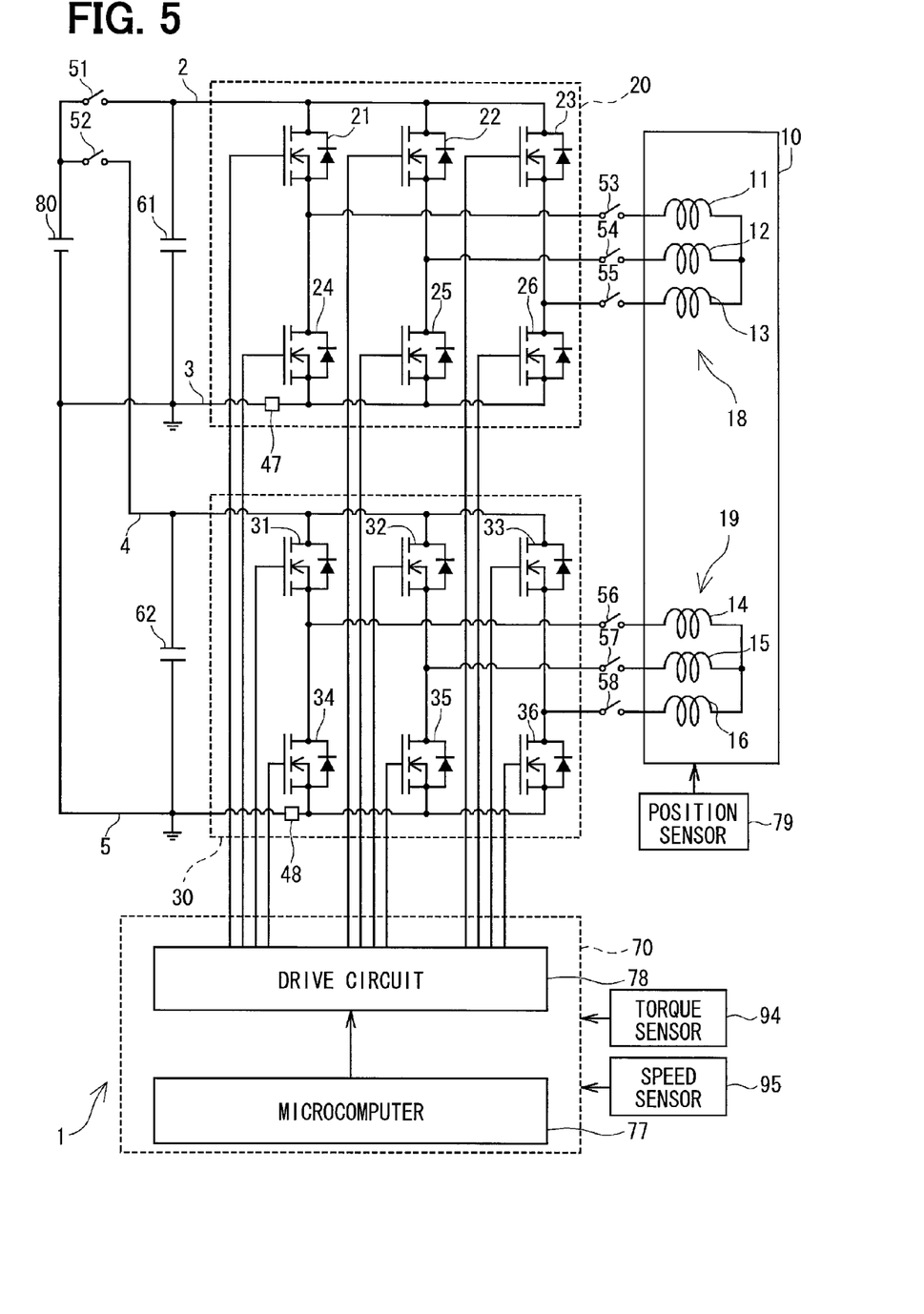
FIG. 5 is a circuit diagram showing, partly in a block form, a rotary electric machine control apparatus according to a second embodiment.

A rotary electric machine control apparatus according to a second embodiment will be described next. As shown in FIG. 5, in the second embodiment, a current detector 47 is provided in the low bus 3 in place of the current detectors 41 to 43 provided in the first embodiment. Further, a current detector 48 is provided in the low bus 5 in place of the current detectors 44 to 46 provided in the first embodiment.

The current detector 47 in the low bus 3 detects a current flowing in the first system. The current detector 48 in the low bus 5 detects a current flowing in the second systems. The control unit 70 detects a short-circuit abnormality between the first winding set 18 and the second winding set 19 or between the first inverter unit 20 and the second inverter unit 30 by a series of processing S200 shown in FIG. 6.

Figure 6:
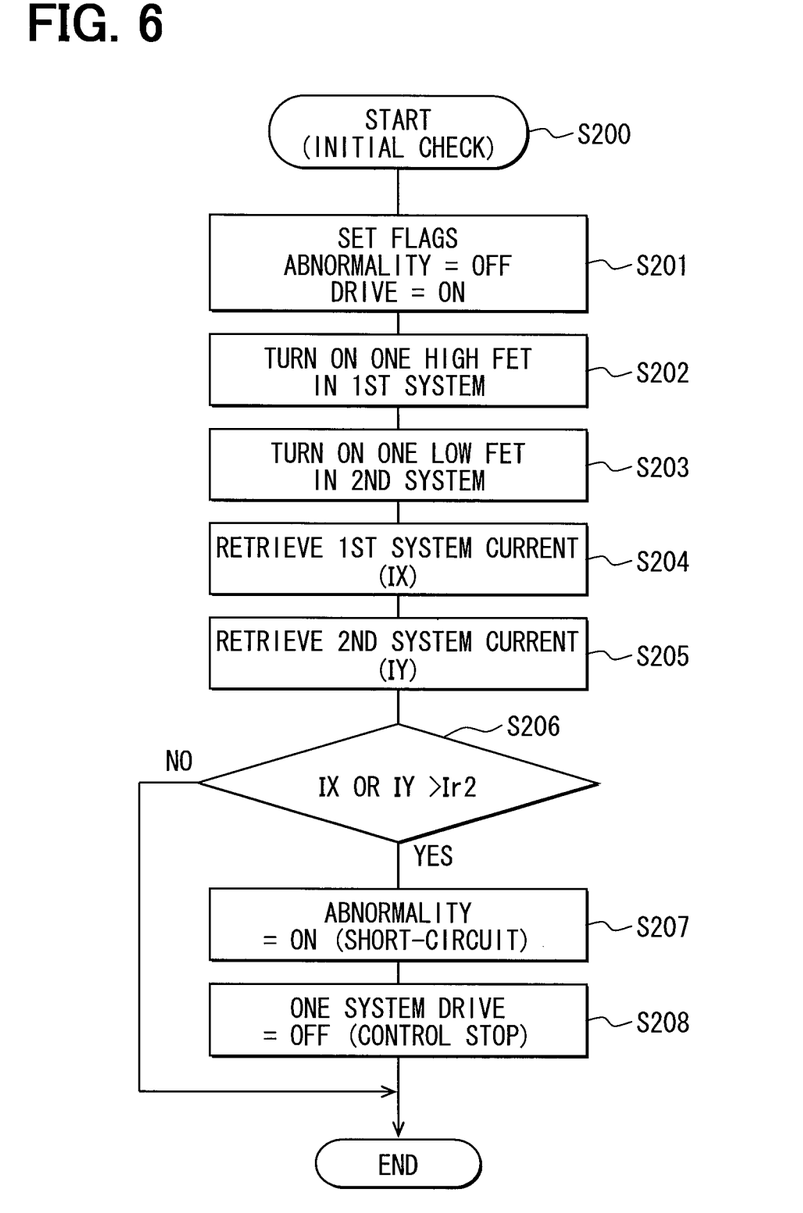
FIG. 6 is a flowchart showing abnormality detection processing performed by the rotary electric machine control apparatus according to the second embodiment.

The control unit 70 executes the processing S200 when an ignition key of a vehicle is turned on, that is, the control apparatus is powered. The control unit 70 executes S200, similarly to S100, before processing the normal drive control for the motor 10. That is, S200 is one of initial check processing, which is executed before starting the drive control for the motor 10. The control unit 70 controls the relays 51 to 58 to turn on at the time of execution of the processing S200.

S201, S202 and S203 are similar to S101, S102 and S103, respectively, and hence no similar description will be made. At S204, the control unit 70 retrieves a current IX of the first system. That is, the control unit 70 retrieves the current IX of the first system detected by the current detector 47. At S205, the control unit 70 retrieves a current IY of the second system. That is, the control unit 70 retrieves the current IY of the second system detected by the current detector 48.

At S206, the control unit 70 checks whether either one of the currents IX, IY is greater than a predetermined reference value Ir1. The control unit 70 checks whether the current IY is greater than the predetermined reference value Ir1. When the current Y is greater than the predetermined current (S206: YES), the control unit 70 executes S207. When the current IY is equal to or less than the predetermined reference value Ir2 (S206: NO), the control unit 70 finishes the series of processing S200.

At S207, the control unit 70 determines that the short-circuit abnormality is present between the first winding set 18 and the second winding set 19 or between the first inverter unit 20 and the second inverter unit 30 and sets the abnormality detection flag to ON. At S208, the control unit 70 sets the drive flag of either one of the first system and the second system to OFF. For example, the control unit 70 sets the drive flag for the second system to OFF. After S208, the control unit 70 finishes the series of processing S200. As described above, the control unit 70 operates as an abnormality detection device in the series of processing S200. The operation of the control unit 70 after the series of processing S200 is similar to the operation executed after the series of processing S100 of the first embodiment and hence no similar description will be made.

One exemplary operation of the control apparatus 1 according to the second embodiment will be described with reference to FIG. 7.

(Normal Operation Case)

Figure 7A:
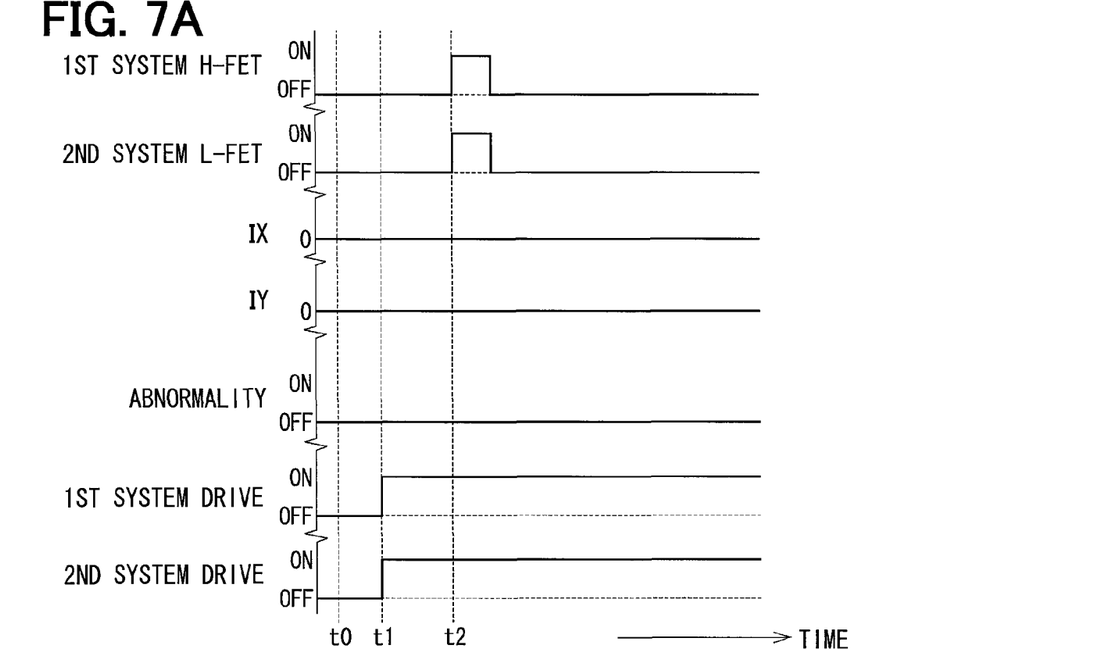
FIGS. 7A and 7B are time charts showing operations of the rotary electric machine control apparatus according to the second embodiment in a normal operation case and an abnormal operation case, respectively.

When the control apparatus 1 operates normally, that is, no short-circuit abnormality is present between the first winding set 18 and the second winding set 19 nor between the first inverter unit 20 and the second inverter unit 30, it operates as shown in FIG. 7A.

When the ignition key is turned on at time t0, the H-FET 21 and the L-FET 34 are OFF and the current detection values IX and IY are 0, the abnormality detection flag is OFF and both drive flags of the first system and the second system are OFF. When the control unit 70 executes S201 at time t1, the abnormality detection flag remains OFF but the drive flags of the first system and the second system are set to ON. When the control unit 70 executes S202 and S203 at time t2, the H-FET 21 and the L-FET 34 are turned on.

Because the currents IX and IY are 0 after time t2, the control unit 70 does not detect any short-circuit abnormality. The abnormality flag remains OFF and the drive flags of the first system and the second system remain ON. The control unit 70 therefore starts to control driving of the motor 10 normally by the first inverter unit 20 and the second inverter unit 30 after the series of processing S200 (initial check processing).

(Abnormal Operation Case)

Figure 7B:
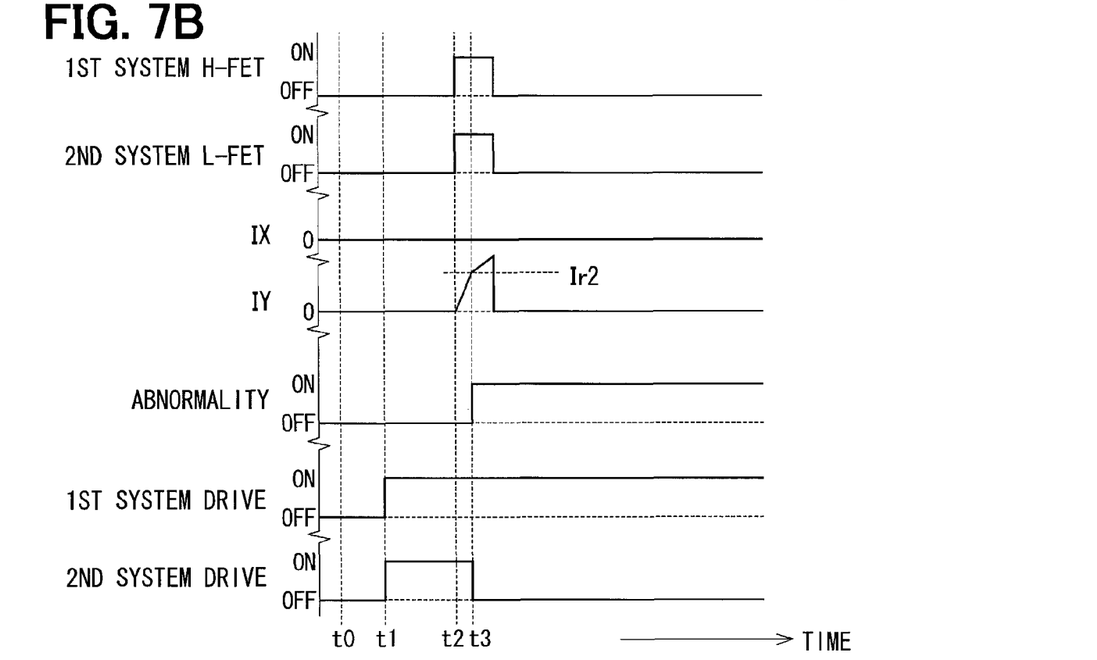

When the control apparatus 1 has an abnormality, that is, for example, a short-circuit abnormality arises between the first winding set 18 and the second winding set 19, it operates as shown in FIG. 7B. When the ignition key is turned on at time t0, the H-FET 21 and the L-FET 34 are OFF and the current detection values IX and IY are 0, the abnormality detection flag is OFF and both drive flags of the first system and the second system are OFF. When the control unit 70 executes S201 at time t1, the abnormality detection flag remains OFF but the drive flags of the first system and the second system are set to ON. When the control unit 70 executes S202 and S203 at time t2, the H-FET 21 and the L-FET 34 are turned on. Because the short-circuit abnormality is present between the first winding set 18 and the second winding set 19, the current detection value IY increases after time t2.

When the current IY reaches the predetermined reference value Ir1 at time t3 (S206: YES), the control unit 70 detects the short-circuit abnormality and sets the abnormality detection flag to ON (S207). The drive flag for the second system remains OFF (S208). The control unit 70 therefore starts to control driving of the motor 10 by only the first inverter unit 20 after the series of processing S200 (initial check processing). Similarly to the first embodiment, when the ignition key is turned off, the abnormality detection flag and the drive flags of the first system and the second system are set to OFF.

As described above, the control unit 70 operates as the abnormality detection device. The control unit 70 can detect the short-circuit abnormality between the two winding sets 18, 19 or between the two inverter units 20, 30 before starting to control driving of the motor 10 based on the current values detected by the current detectors 47, 48 when the high-potential side switching element 21 to 23 of one of the two inverter units 20, 30 and the low-potential side switching element 34 to 36 of the other inverter unit 30.

Other Embodiment

According to the above-described embodiments, it is assumed as one example that only the H-FET 21 of the first system and the L-FET 34 of the second system are turned on at the time of initial check for the short-circuit abnormality. As the other embodiment, the other H-FET 22 or 23 of the first system and the other L-FET 35 or 36 may be turned on. In addition it is also possible to detect a short-circuit abnormality by turning on one L-FET 24, 25, 26 of the first system and one H-FET 31, 32, 33 of the second system. In this case, when the L-FET 24, 25, 26 of the first system and the H-FET 31, 32, 33 of the second system are controlled to turn on under presence of the short-circuit abnormality, a current flows to the low bus 3 side of the L-FET 24, 25, 26 of the first system from the high bus 4 of the second system.

According to the above-described embodiments, only one H-FET and only one L-FET are turned on at the time of initial check. However two or more H-FETs and two or more L-FETs may be turned on at the time of initial check.

Further, according to the above-described embodiments, the relays 51, 53, 54, 55 are turned off to prevent the motor 10 from being driven by the first inverter unit 20 as an example. In addition, the relays 52, 56, 57, 58 are turned off to prevent the motor 10 from being driven by the second inverter unit 30 as an example. As the other embodiment, however, the relay 51 or any one of the relays 53, 54, 55 may be turned off to prevent the motor 10 from being driven by the first inverter unit 20. Similarly, the relay 52 or any one of the relays 56, 57, 58 may be turned off to prevent the motor 10 from being driven by the second inverter unit 30.

Still further, as the other embodiment, it is possible to provide a relay at the neutral point of the first winding set 18 in place of the relays 53, 54, 55 so that the relay allows or interrupts current flow among phase coils 11 to 13. It is also possible to provide a relay at the neutral point of the second winding set 19 in place of the relays 56, 57, 58 so that the relay allows or interrupts current flow among phase coils 14, 15, 16.

It is further possible, as the other embodiment, to provide no relays. For preventing the motor 10 from being driven by the first inverter unit 20, all FETs 21 to 26 of the first inverter unit 20 may be turned off. Similarly, for preventing the motor 10 from being driven by the second inverter unit 30, all FETs 31 to 36 of the second inverter unit 30 may be turned off.

According to the above-described embodiment, as an example, the control unit 70 stops the second inverter unit 30 from driving the motor 10 upon detection of the short-circuit abnormality. As the other embodiment, the control unit 70 may stop the first inverter unit 20 from driving the motor 10 upon detection of the short-circuit abnormality. As the other embodiment of the present disclosure, the rotary electric machine may be a rotary electric machine of plural phases other than three phases. The control apparatus according to the embodiments is not limited to be used for the rotary electric machine of the electric power steering apparatus but may be used for rotary electric machines of other apparatuses.

What is claimed is:

1. A rotary electric machine control apparatus for controlling a rotary electric machine, which has two winding sets formed of coils corresponding to plural phases, the rotary electric machine control apparatus comprising:

two inverter units provided in correspondence to the two winding sets for converting electric power from a power source to the rotary electric machine by turning on and off plural switching elements, which include high-potential side switching elements provided at a high-potential side of the power source and low-potential side switching elements provided at a low-potential side, the high-potential side switching element and the low-potential side switching element forming a switching element pair corresponding to a phase of the winding in each of the winding set;

a current detection device for detecting a phase current flowing in each of the two inverter units; and a control unit for controlling driving of the rotary electric machine by controlling on/off operations of the switching elements of the two inverter units, wherein the control unit includes an abnormality detection device for detecting, before starting of drive control for the rotary electric machine, a short-circuit abnormality between the two winding sets or the two inverter units based on a current detection value of the current detection device by turning on only at least one of the high-potential side switching elements of one of the two inverter units and at least one of the low-potential side switching elements of the other of the two inverter units.

2. The rotary electric machine control apparatus according to claim 1, wherein:

the control unit controls driving of the rotary electric machine by only one of the two inverter units when the abnormality detection device detects the short-circuit abnormality.

3. The rotary electric machine control apparatus according to claim 1, wherein:

the current detection device is provided in each of the switching element pairs of the two inverter units.

4. The rotary electric machine control apparatus according to claim 1, wherein:

the current detection device is provided in a low bus connecting a low-potential side of the power source and the low-potential side switching elements in each of the two inverter units.

5. An electric power steering apparatus comprising:

the rotary electric machine control apparatus according to claim 1; and a rotary electric machine for generating an assist torque for assisting a steering operation of a driver.

6. The rotary electric machine control apparatus according to claim 1, wherein:

the control unit normally controls, only after a detection operation of the short-circuit abnormality, the on/off operations of the switching elements for driving the rotary electric machine thereby to generate assist torque for assisting a steering operation of a vehicle driver.

7. The rotary electric machine control apparatus according to claim 1, wherein:

the abnormality detection device turns off all of the low-potential side switching elements of the one of the two inverter units and all of the high-potential side switching elements of the other of the two inverter units, for detecting the short-circuit abnormality.

* * * * *